United States Patent Office 2,925,393
Patented Feb. 16, 1960

2,925,393

ACTIVATION OF CLAY BY ACID TREATMENT, AGING IN INHIBITED OIL, AND CALCINATION

Wright Wesley Gary, Princeton, N.J., assignor to Minerals & Chemicals Corporation of America, Menlo Park, N.J., a corporation of Maryland No Drawing. Application June 7, 1957
Serial No. 664,167

1 Claim. (Cl. 252—450)

This invention relates to the preparation of adsorptive contact masses from naturally occurring acid-activatable clays. The invention particularly relates to a process by means of which contact masses suitable in size range, and other desirable properties, for use as catalysts in the well-known fixed or moving bed hydrocarbon cracking processes are produced from kaolin clay. Although, as above stated, the adsorptive contact masses of this invention are especially useful as hydrocarbon conversion catalysts in well-known cracking processes, they also have usefulness as adsorbents for decolorizing vegetable and mineral oils and for various other purposes. The above-mentioned hydrocarbon cracking processes are employed, as is well known, for the purpose of converting petroleum hydrocarbons to gasoline.

In fixed bed cracking, the hydrocarbon vapors are passed through a stationary bed of catalyst particles, while in moving bed cracking processes, as exemplified by Thermofor catalytic cracking (T.C.C.) and Houdriflow operations, the catalyst particles gravitate towards the base of the reactor from whence they are conveyed through regenerators and back to the top of the reaction zone for another pass therethrough. The Houdriflow process differs from the T.C.C. process in the manner of conveying regenerated catalyst particles for recirculation through the reactor, a gas lift being used in the former case and elevators in the latter. Catalyst particles for fixed and moving bed processes are relatively coarse, ranging in size from about 10-mesh to about 4-mesh, and usually in the form of pellets or "beads."

To be acceptable, a cracking catalyst should possess adequate activity and hardness and it should exhibit satisfactory catalyst life while in service. The reason for needing good cracking activity in a catalyst is self-evident, and a sufficient degree of hardness is necessary therein to minimize attrition of the catalyst particles during their utilization. Attrition is detrimental since it results in loss of active catalyst as fines, which are carried out in the effluent vapor stream, with attendant increase in operating cost. Catalyst life, as the name implies, simply refers to the period of economic usefulness of a catalyst in service.

In a co-pending U.S. patent application of Serial No. 499,515, filed April 5, 1955, by James V. Weir and Alfred J. Robinson, there is disclosed an improved process for the preparation of adsorptive contact masses from naturally occurring acid-activatable clays and particularly from kaolin clays. In its preferred embodiment, the process of said co-pending application involves mixing clay and sulfuric acid together to produce a plastic mass, forming appropriately sized masses, as for example by extrusion, from said plastic mass; aging the clay-acid masses in a hot hydrocarbon liquid for a period of time such as to permit substantial reaction between the clay, particularly the alumina of said clay, and the acid; and calcining the aged clay-acid masses at a temperature level sufficiently high to decompose aluminum sulfate which formed therein during the aging and to thereby convert said masses to high quality adsorptive contact masses especially suitable as hydrocarbon cracking catalysts.

The process disclosed in the aforesaid co-pending application of Weir and Robinson, as pointed out therein, represents a radical departure from the well-known prior art acid leaching methods comprising essentially the basic steps of reacting the clay with dilute acid, usually dilute sulfuric acid, to convert part of said clay to water soluble form and then leaching or washing substantially all of the resulting water soluble material from the clay-acid reaction product with water, leaving behind a residue from which is obtained the final product and which is of different chemical composition than the starting clay since a portion of said clay has been removed in the leaching step. In the novel process of the co-pending Weir and Robinson application, on the other hand, the clay is reacted with sulfuric acid and then the clay-acid mixture is calcined to decompose water soluble products of the reaction, which products correspond substantially to those leached from said mixture in the prior art acid leaching method, and to convert said mixture to a material suitable for adsorptive contact purposes which material is substantially the same in chemical composition as the starting clay, on a volatile free basis, but of enhanced activity. The prior art acid leaching processes can be considered wet methods of clay activation since they entail an aqueous leaching step, whereas the process of the co-pending Weir and Robinson application can be considered a dry one in that it does not require aqueous leaching of the clay-acid reaction product for removal of its water soluble portion.

The present invention is the result of my discovery of a preliminary conditioning treatment of the hydrocarbon liquid in which the clay-acid mixture is aged, as taught in the co-pending application of Weir and Robinson, whereby a substantial improvement in hardness of final contact masses is attained. Thus contact masses, produced according to the Weir and Robinson process of the aforesaid co-pending patent application in which the aging is carried out in a hot hydrocarbon liquid which has previously been conditioned, as taught herein, will be found to be high quality adsorptive contact masses of hardness substantially superior to that of contact masses produced in the same manner except aged in a hydrocarbon liquid which has not been subjected to the aforesaid preliminary conditioning treatment.

Accordingly, it is one object of the present invention to provide an improved process for preparing adsorptive contact masses from clay.

A further object of the invention is to provide an improved process for preparing hydrocarbon cracking catalysts of superior hardness.

Other objects and advantages of the invention will be apparent from the description thereof which follows.

As previously noted, the process of the present invention is intended primarily for use on kaolin clays, by which is meant those naturally occurring clays containing kaolinite as the chief mineral constituent. The approximate chemical composition of kaolinite is represented by the formula: $Al_2O_3 \cdot 2SiO_2 \cdot 2H_2O$. The weight ratio of $SiO_2$ to $Al_2O_3$, indicated by this formula, is 1.18 and kaolin clays normally possess $SiO_2/Al_2O_3$ ratios of from 1.0 to 1.5.

While I prefer to use degritted raw clay (that which has been refined only to the extent that grit, foreign bodies and clots of undispersed clay have been eliminated) as a starting material in the process, I wish to have it clearly understood that the invention is not limited to the treatment of such a product. Clays which have received other preliminary treatments may still be amenable to processing in accordance with teachings herein. Examples of preliminary treatments falling within this category are deironing by physical or chemical methods, conventional classifying operation, and even partial acid activation by the previously mentioned wet procedures. The volatile matter content (V.M.) of the starting clay should preferably not be so high as to make too diluent a mixture of clay and acid for optimum handling under the conditions of the particular processing involved. I have obtained excellent results using a starting clay of about 14 percent V.M. with moderate dosages of concentrated sulfuric acid. By volatile matter (V.M.) is meant that part of the clay which would be eliminated by heating said clay at a temperature of about 1700° F. to substantially constant weight. The weight of the clay without its volatile matter is referred to as the volatile free (V.F.) weight of said clay.

In putting the process of my invention into practice, a naturally occurring clay, as for example kaolin clay, and sulfuric acid are first mixed to an appearance of homogeneity in any apparatus suitable for the purpose, as for example a pug mill. The clay-acid mixture is then extruded to form pellets, or otherwise shaped into masses within the desired size range. Next, the pellets or shaped masses are immersed and aged in a hydrocarbon liquid, which has been previously conditioned in the manner hereinafter disclosed, under such conditions of time and temperature as to bring about substantially complete reaction between the clay and the acid. This aging of the pellets, or other shaped masses may be accomplished, for example, in a screw conveyor by conveying said pellets or masses, while immersed in the hydrocarbon liquid at the desired temperature level, therethrough at a rate such as to afford adequate time for substantially complete reaction between clay and acid.

The aged pellets are finally subjected to calcination treatment, to effect desulfation thereof, with attendant conversion of said pellets to high-quality adsorptive contact masses particularly suitable as hydrocarbon cracking catalyst. The term pellets, as used above and hereinafter throughout the specification and claim, except as otherwise indicated, is intended to include within its meaning not only extruded pellets but other suitably shaped masses within the proper size range which have been formed by methods well known to those skilled in the art.

I prefer to use concentrated sulfuric acid, such as the commercially available 66° Bé. (about 93 percent $H_2SO_4$) grade, for the clay-acid reaction of our process, water being added, if necessary, to facilitate ease of pugging, or otherwise mixing, the ingredients. However, any strength acid consistent with proper plasticity of mix for the dosage employed can be used within the scope of this invention. I prefer to use acid dosages from about 60 percent to about 100 percent in our process, acid dosage being defined as the weight of 100 percent acid per weight of volatile free clay expressed on a percentage basis.

Although acid dosages much lower than 60 percent, down to as low as 20 percent in fact, can be used in the process with some benefit, the clay conversion gradually falls off with decreasing dosage until ineffectual levels are reached. With the lower dosages of acid, it has been found necessary to have higher water/acid ratios in the mix than will suffice for more normal dosages, the principal reason for this being to adjust the said mixes to conditions of optimum plasticity for working. When a 20 percent dosage is employed, for example, good plasticity is attainable with a dilute acid of only 50 percent $H_2SO_4$ concentration. On the other hand, very high acid dosages, particularly on clays of relatively coarse particle size, sometimes produce mixtures too thin for adequate workability. In this event, the situation can frequently be remedied by either grinding the clay prior to acid addition or by substituting fuming sulfuric acid for the more dilute acid conventionally used. Although the preferred range of acid dosage has been given as that from about 60 percent to about 100 percent, dosages higher than 100 percent can be used within the scope of the invention so long as a workable mix is obtainable in the process. Approximately 130 percent dosage represents the amount of acid that would theoretically be required for substantially complete reaction with an average kaolin clay, although amounts in excess of this can be used within the scope of the invention.

As previously indicated, the mixture of clay and acid is preferably formed into masses of appropriate size by extrusion or equivalent method before the aging step of our process. The forming operation can be performed by extrusion, pilling or any equivalent method known to those skilled in the art; the preferred method being extrusion by means of an auger mill or extruder. For best results in extrusion, the V.M. of the mix should be between about 30 and about 65 percent, with the preferred range being from 50 to 55 percent.

The hydrocarbon liquid in which the pellets are aged should be one which is substantially non-reactive with sulfuric acid, at the aging temperature level, although minor amounts of matter capable of reacting with the acid can be tolerated therein. These hydrocarbon liquids should preferably have low vapor pressures at the aging temperatures, but I do not wish to exclude the possibility of using lower boiling materials in conjunction with a condenser system to prevent loss of vapors. Examples of readily available hydrocarbon liquids which are suitable for the process are saturated aliphatic higher molecular weight hydrocarbons which have been treated with sulfuric acid for removal of sulfonatable components such as, for example, certain white mineral oils. Kerosene can also be used as the aging medium if condenser systems are available.

Optimum temperatures for our oil aging fall between the limits of about 220° F. and about 400° F. and optimum times within the range from about 1 to about 24 hours, with the times required depending on the temperatures used. I prefer to age within the temperature range from 275 to 325° F. for a period of from about 1 to about 5 hours. When aging temperatures become too high, the clay-acid reaction proceeds rapidly and the final product is excessively soft. When aging temperatures are too low, the product is also soft but in this case the cause seems to stem from insufficient reaction due to a very slow reaction rate.

As previously indicated, the hydrocarbon liquid in which the pellets are aged is subjected to a preliminary conditioning treatment for the purpose of effecting substantial improvement in the hardness of the final contact masses. Although the pellets can be aged in hydrocarbon liquid which has not been subjected to said preliminary conditioning treatment the final contact masses will be found to be of only mediocre hardness by comparison with adsorptive contact masses produced in the same manner, except for the preliminary conditioning of the oil in which they are aged. The preliminary conditioning treatment of the present invention comprises incorporating a small amount of an antioxidant compound in said hydrocarbon liquid prior to using said hydrocarbon liquid as an aging medium in the present invention. The antioxidant may be added to fresh oil used as the aging medium for clay-acid masses in the initial start-up of a batch or continuous aging process or, if desired, to make-up portions of any fresh or unconditioned oil added during the process to replace oil lost from the system by entrainment in the acid-clay mass or otherwise lost, particularly when substantial make-up hydrocarbon oil is used. After shutdown of apparatus in which aging of clay-acid masses in the hydrocarbon liquid takes place, the incorporation of an antioxidant in the hydrocarbon liquid prior to its reuse as an aging medium is necessary to obtain the benefits of the invention. This is so because the hydrocarbon liquid deteriorates in some unknown way in respect to performance in producing masses of ultimate satisfactory hardness when said hydrocarbon liquid stands without the presence of clay and acid at elevated temperatures. By these practices the oil will include at all times sufficient antioxidant to maintain the proper level of oil conditioning to assure the production of uniformly hard pellets throughout the processing. The conditioned hydrocarbon liquids may be used substantially indefinitely as aging mediums for clay-acid pellets without deterioration, insofar as their hardening effect on the final adsorptive masses are concerned provided that said hydrocarbon liquids are held at elevated temperatures with clay and acid therein at all times. It is not essential that the hydrocarbon liquids used for make-up purposes be previously conditioned as taught herein; small quantities of fresh hydrocarbon liquids which have not been so conditioned may be used in normal make-up quantities with substantially no lowering of the hardness of the final pellets or other deleterious aftereffects.

Suitable antioxidizing agents or antioxidants to condition those hydrocarbon liquids within the purview of my invention include non-metallic antioxidants which are stable and have low vapor pressures at the elevated temperatures to which they are subjected when incorporated in the hydrocarbon liquid and which leave no deleterious residue on the pellets or masses after the calcination thereof. It has been found that antioxidants including metallic or non-volatile inorganic constituents either poison the catalyst, in the case of metallic constituents such as iron, or in the case of alkali or alkaline earth constituents such as sodium, deposit salts on the pellets which act as fluxing agents during the calcination of the aged pellets.

It has been found that certain aromatic compounds in which oxidation is reversible are particularly effective as conditioning agents for the hydrocarbon liquid for the purposes of the invention, such compounds being broadly classified as phenolics and p-amino phenols.

Among the phenolic antioxidizing agents capable of reversible oxidation are those polyhydroxyl aromatic compounds with ortho and para hydroxyl groups, the prototype of which is hydroquinone (p-dihydroxybenzene) which oxidizes reversibly to quinone. Others in this category include pyrocatechol (catechol, o-dihydroxybenzene) and pyrogallol (1,2,3-trihydroxybenzene). However, other substituted aromatics which do not have at least two directly substituted hydroxyl groups are effective agents if their structure is comparable to that of the ortho and para hydroxyl compound in respect to electronic configuration and mobility; these aromatics may be substituted benzenes, condensed aromatic structures containing a benzene ring or even heterocyclic compounds and will be hereinafter referred to as "quasi-ortho and para polyhydroxy phenols." This classification includes 3,4-methylene-dioxyphenol in which one hydroxyl group is para to an oxygen atom attached to the benzene nucleus and 3-phenyl isocoumarone, which has an hydroxyl group in the enolic form. In other quasi-compounds, for example, the tocopherols, a heterocyclic oxygen para to a free hydroxyl group gives the requisite electronic configuration. Alpha-naphthol has the configuration of an effective ortho compound. Frequently partial substitution in the aromatic ring is made to develop oil solubility, lowered toxicity, improve heat stability and lower vapor pressure. Such substitution has no harmful effect on the antioxygenic activity unless complete substitution destroys the activity of the compounds by restricting electron mobility. For example, a preferred species of antioxidants for the purpose herein set forth are alkylated polyhydroxyl or quasi-polyhydroxyl compounds, such alkylated compounds displaying improved oil solubility and lowered vapor pressure over their non-alkylated counterparts and including butylated hydroquinone, t-amyl hydroquinone and t-butyl catechol. It has been found that the so-called "hindered phenols," in which the reactivity of the phenolic group is reduced by the presence of a plurality of tertiary alkyl groups in the aromatic nucleus which act to sterically hinder the activity of the compound are of superior character for the purposes of this invention. These compounds which may be prepared by reacting phenols with low molecular weight olefins have outstanding inertness, lack of toxicity, oil solubility and potency. Useful "hindered phenols" include isomers of butylated hydroxy toluene, particularly 2,6-di-tertiary butyl-para cresol, isomers of butylated hydroxy anisol, such as 4-methyl-2,6-di-tertiary butyl methoxybenzene, and 2,6-di-tertiary amyl-para cresol. The hindered phenolic antioxidants may also be used in admixture with other compounds such as aromatic amines, and higher fatty acids.

Another class of antioxidants suitable for the purposes of the invention include aromatic amino antioxidants which are similar to phenolic antioxidants, except that the free hydroxyl groups in the benzene nucleus have been replaced wholly or in part by amino groups. They are represented typically by p-amino phenol and hydroxy naphthyl amine, the former of which oxidizes reversibly to quinonimine in a manner comparable to that of hydroquinone. Among the more useful antioxidants of this class are those in which an organic constituent is substituted in the amino group to increase the oil solubility, lower the vapor pressure and increase the stability of the molecule. The requisite configuration for this class is comparable to that outlined for phenolic antioxidants which oxidize reversibly. Suitable antioxidants in this classification include p-benzylaminophenol, p-isobutyl-aminophenol, p-n-butylaminophenol and p-di-n-butyl-aminophenol.

Other useful antioxidants are those formed by the condensation of aldehydes, ketones or alcohols with aniline or other aromatic amines and aminophenols, typical members of this group including: phenyl-A-naphthylamine, phenyl-A-naphthylamine, p-hydroxydiphenylamine, 2,4-diaminodiphenylamine, N,N'-diphenylethylene diamine and p,p'-diaminodiphenylmethane, Other antioxidants are: acyl-substituted arylene diamines, such as 4-aminomethylacetanilide, p-amino acetanilide, and 3-diethylamino acetanilide; an aromatic compound that contains only C, H plus S, the S being directly attached to the aromatic ring (suitable species are A- and B-thionaphthol, diphenyl disulfide, thiocresol, dimercapto-biphenyl, naphthyl disulfide); compounds of the general formula $(ROSCSC_2H_4)_2O$, where R is an alkyl or aralkyl radical, such as dixanthylethyl ether, compounds of the general formula

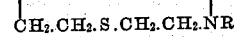

in which R represents an alkyl, aryl or aralkyl hydrocarbon group; compounds of the general formula $RHNC_6H_4NO$, in which R represents an alkyl or an aralkyl radical, aminodiphenyl amines in which one phenyl nucleus is amino-substituted and the other is alkyl substituted alkyl aromatic diethers containing two alkoxy groups attached to an aromatic nucleus, at least one alkoxy group containing a tertiary alkyl radical of 4 to 5 carbon atoms, or two alkoxy groups attached to an aromatic nucleus para to each other; aliphatic diamino substituted diaryl methane compounds, such as tetramethyl diamino diphenyl methane.

It will be understood that the choice of antioxidant added to fresh, or deteriorated used oil to render that oil useful for the purposes set forth will depend not only on the particular composition of oil used in the aging process, but also on the temperatures maintained during the aging process and the time duration in which elevated temperatures are maintained, whereby the thermal stability characteristics and the vapor pressure of the antioxidant is a factor in determining the selection. The optimum amount of antioxidant relative to the hydrocarbon oil used likewise is subject to wide variation and should be determined experimentally. There is no empirical formula or theory on which to base this choice because the correlation between the antioxidation potential of any compound and its ability in the system to insure adequate pellet hardness is obscure. However, it is a fairly safe procedure to employ a ratio of antioxidant to any make-up oil in which it is incorporated substantially equal to the ratio of antioxidant to unconditioned oil used preliminary to aging the clay-acid masses in the oil.

At any stage of the process, the criterion of satisfactory oil conditioning is the determination of satisfactory ultimate hardness of pellets aged in the oil at that particular stage. Where at any stage the inherent ability of the clay-acid masses held at elevated temperatures in the hydrocarbon liquid to condition the oil is inadequate, this being manifest by unsatisfactory ultimate hardness of pellets aged with such oil, then an antioxidant should be added. This situation will prevail when initiating the aging process using fresh hydrocarbon liquid or hydrocarbon liquid from previous aging runs which has been made available for re-use after a shutdown of the aging apparatus or possibly on adding make-up oil, particularly when such make-up oil is added in large quantities to the system.

In general from about .010 percent to about .100 percent of an antioxidant, based on the weight of unconditioned oil used, is satisfactory for the purpose of producing pellets of adequate hardness. When a hindered phenol is the conditioning agent about .025 percent by weight of the unconditioned oil is a satisfactory amount of antioxidant to achieve adequate hardness of catalyst pellets.

In the calcination of the aged pellets, to effect their desulfation, I have found that for best results the temperature should be between the limits of about 900 and about 1600° F. and the calcination time should preferably be not greater than about 24 hours. The temperature and times of calcination will depend to a large extent on the atmosphere within the furnace in which the pellets are calcined. While I do not wish to exclude calcination temperatures outside of the range disclosed, I would like to make clear that at temperatures much below 900° F. the aluminum sulfate decomposition may be incomplete and that temperatures above 1600° F. may result in lowered activity of the final product.

It is within the scope of the invention to incorporate not more than about 10 percent, on a total weight of mix basis, of a combustible filler into the clay-acid mixture of our process prior to formation of the said mixture into shaped masses. This filler, among other things, serves to increase the porosity of the final catalyst since it is eliminated during the calcination step leaving voids behind. Examples of filler suitable for the purpose are wood flour, corn meal, sawdust, carbon and the like.

Following are examples which are included herein for the purpose of demonstrating the improvement in hardness attainable by means of the novel conditioning of hydrocarbon liquids by incorporation of small amounts of antioxidants therein prior to using them as aging mediums in the present process. These examples are for purposes of illustration only and they should not be construed as limiting the invention to any partciular embodiments disclosed therein.

*Example I*

This example is a control test to indicate the degree of hardness attainable when clay-acid pellets are aged in a hydrocarbon liquid which has not been conditioned.

Georgia kaolin clay is mixed with sulfuric acid of about 93.2 percent concentration, the amount of acid used being equivalent to a dosage of about 80 percent. The mixture of clay and acid is formed into pellets about 3/16 in. long and of about 3/16 in. diameter by extrusion. The extruded pellets are aged in unconditioned white mineral oil, at a temperature of about 300° F. for a period of about three hours. The aged pellets are calcined in an atmosphere of steam and hot flue gases containing reducing components until they have been substantially desulfated, during which operation they reach a maximum temperature of about 1430° F. The desulfated pellets are tested by the well-known Cat-A test for catalytic activity.

The Cat-A test comprises a procedure described by J. Alexander and H. G. Shimp in an article on page R537 of National Petroleum News, Technical Section, August 2, 1944. In this method, a standard light East Texas gas oil is contacted at a rate of 5 cc. per minute for 10 minutes with 200 cc. of catalyst pellets at 800° F. The liquid product from the cracking test is collected at a temperature of 60° F. Catalytic activity is measured as the volume percent yield of gasoline on a no-loss basis (N.L.B. gasoline yield) and given as the volume of 410° F. end point gasoline distilled from the aforesaid cracked product, corrected for 100 percent recovery, expressed as a percentage of the volume of gas oil charged. As part of the Cat-A test, the weight of coke deposited on the catalyst, weight of gas produced, and gas specific gravity are determined. The coke and gas weights are expressed as percentages of gas oil charged. Two Cat-A cycles are run with only the data from the second cycle being used since experience has shown these data to be sound. In general the ratio of N.L.B. gasoline yield to coke yield should exceed about 9/1 or 10/1; gas gravity should be at least 1.2 or higher.

The Cat-A test on the pellets of this example reveals an N.L.B. gasoline yield of about 32 percent, a ratio of N.L.B. gasoline yield to coke yield exceeding 10/1, and a gas gravity higher than 1.2. These results, as one skilled in the art will recognize, show that the pellets of the present example are of excellent quality insofar as activity and selectivity is concerned.

The pellets produced in this example may be tested for hardness by a ball mill procedure, as described hereinbelow. The test for hardness comprises a procedure in which a sample of catalyst pellets is first separated into three fractions by screening through 3-mesh and 5-mesh sieves until about 200 grams of the 3/5 fraction is obtained. The 3/5 fraction is then heat treated at 1050° F. by passing bone dry air over it for three hours. The heat treated material is poured into a tared 100 cc. graduate to the 80 cc. mark, with tapping to gently pack the particles. The weight of the 80 cc. of catalyst particles is determined and they are then placed in a stainless steel cylindrical container with four polished stainless steel ball bearings, each of 15/16 inch diameter. The container is closed tightly and rotated about its longitudinal axis at about 80 r.p.m. on a roller arrangement, for about one hour. After the rotation of the container has been stopped, the catalyst solids therein are screened on a 6-mesh sieve and their hardness is calculated as the percentage of total sample (i.e. the 80 cc.) weight represented by the plus-6-mesh fraction of the final material. The pellets of the present example possess a hardness of from about 65 to about 75 percent as determined by the above-described ball mill procedure. For comparative purposes the commercial catalyst Filtrol 62, which is prepared from subbentonite clay, when measured by the aforesaid ball mill method, is found to possess a hardness of 90 percent.

*Example II*

This example is similar to Example I except that the white mineral oil in which the clay-acid pellets are aged is first conditioned as taught herein.

White mineral oil, such as that used in Example I, is conditioned by incorporating therein .025 percent by weight of a commercial hindered phenol antioxidant, Paranox 441, marketed and sold by Enjay Corporation, Inc. Paranox 441 is the 2 and 3 mixture of isomers of di-tertiary butyl para cresol.

Georgia kaolin clay is mixed with sulfuric acid of about 93.2 percent concentration, the amount of acid used being equivalent to a dosage of about 80 percent.

The mixture of clay and acid is formed into pellets about 3/16 in. long and of about 3/16 in. diameter by means of extrusion. The extruded pellets are aged in the white mineral oil having .025 percent by weight of Paranox 441 incorporated therein, maintained at a temperature of about 300° F., for a period of about 3 hours. The aged pellets are calcined in an atmosphere of steam and hot flue gases containing reducing components until they have been substantially desulfated, during which operation they reach a maximum temperature of about 1430° F.

The desulfated pellets tested by the Cat-A procedure are substantially equivalent to those of Example I in catalytic activity. Samples of the pellets tested for hardness by the previously described ball mill procedure were found to possess hardnesses of well above 90 percent and, in fact, as high as 97 or 98 percent. Thus the pellets of the present example have been shown to be superior to Filtrol 62 in this respect.

Comparison of the hardnesses of the pellets of the present example with those of the pellets of Example I clearly shows the unexpected improvement in hardness attributable to my novel aging liquid conditioning treatment.

I claim:

A process for the preparation of cracking catalyst pellets from kaolin clay including the steps of mixing the kaolin clay with about 20 to 130 percent dosage of sulfuric acid of a concentration within the range from about 50 percent to fuming sulfuric acid; forming pellets from the resulting mixture of clay and acid; aging the pellets for about 1 to 24 hours by immersing them in white mineral oil containing a minor quantity of di-tertiary butyl-para cresol and maintained within the temperature range from about 220 to about 400° F.; and calcining the aged pellets within the temperature range of about 900 to about 1600° F. for a period of time not greater than about 24 hours.

References Cited in the file of this patent

UNITED STATES PATENTS

| | | |
|---|---|---|
| 1,781,265 | Baylis | Nov. 11, 1930 |
| 2,787,599 | Belden | Apr. 2, 1957 |